United States Patent
Niu

(10) Patent No.: US 10,755,382 B2
(45) Date of Patent: Aug. 25, 2020

(54) SYSTEM FOR PIECING IMAGE CHINESE CHARACTERS INTO A WORD AND MOBILE TERMINAL

(71) Applicant: Yi Niu, Shatin (HK)

(72) Inventor: Yi Niu, Shatin (HK)

( * ) Notice: Subject to any disclaimer, the term of this patent is extended or adjusted under 35 U.S.C. 154(b) by 99 days.

(21) Appl. No.: 16/116,927

(22) Filed: Aug. 30, 2018

(65) Prior Publication Data
US 2019/0096034 A1 Mar. 28, 2019

(51) Int. Cl.
| | | |
|---|---|---|
| G06T 3/40 | (2006.01) | |
| G06K 9/20 | (2006.01) | |
| G06K 9/62 | (2006.01) | |
| G09B 19/06 | (2006.01) | |
| G06T 11/60 | (2006.01) | |
| G06K 9/34 | (2006.01) | |
| G09B 5/06 | (2006.01) | |

(52) U.S. Cl.
CPC ............. G06T 3/4038 (2013.01); G06K 9/20 (2013.01); G06K 9/344 (2013.01); G06K 9/6215 (2013.01); G06T 11/60 (2013.01); G09B 19/06 (2013.01); *G06K 2209/011* (2013.01); *G09B 5/065* (2013.01)

(58) Field of Classification Search
CPC ....... G06T 3/4038; G06T 11/60; G06K 9/344; G06K 9/6215; G06K 9/20; G06K 2209/011; G09B 19/06; G09B 5/065; G06F 40/284
See application file for complete search history.

(56) References Cited

U.S. PATENT DOCUMENTS

| | | | | |
|---|---|---|---|---|
| 8,539,349 B1* | 9/2013 | Kirshenbaum | ....... | G06F 40/284 715/264 |
| 2010/0008582 A1* | 1/2010 | Kim | ....... | G06K 9/228 382/177 |
| 2014/0297256 A1* | 10/2014 | Rogowski | ....... | G06K 9/00 704/2 |

* cited by examiner

*Primary Examiner* — Jaime M Holliday
(74) *Attorney, Agent, or Firm* — Zhihua Han; Wen IP LLC

(57) ABSTRACT

The present disclosure provides a system for stitching image Chinese characters into a word. In the system, a scanning module scans a plurality of images, wherein a physical space of each image is mapped with one logic space on which a colliding unit is formed; when a collision event between the colliding unit of the image and a colliding unit of its neighboring image occurs in the logic space, an associating module associates the Chinese character corresponding to the colliding unit with the Chinese character corresponding to the colliding unit of its neighboring image to generate a word, and when the word was recorded in a pre-stored vocabulary, a displaying module displays the word; in this way, the system enables Chinese beginners to learn words such as compounds, idioms, and proverbs, which improves the efficiency of Chinese beginners to learn Chinese, promotes their learning enthusiasm, and enhances user experience. Another object of the present disclosure is to provide a mobile terminal that employs the system for stitching image Chinese characters into a word.

14 Claims, 2 Drawing Sheets

SYSTEM FOR PIECING IMAGE CHINESE CHARACTERS INTO A WORD AND MOBILE TERMINAL

CROSS REFERENCE OF RELATED APPLICATION

This patent application claims the priority to Hong Kong patent application No. 17109842.2, filed on Sep. 27, 2017, the disclosure of which is incorporated by reference in its entirety herein.

BACKGROUND OF THE PRESENT INVENTION

Field of Invention

The present disclosure relates to a system for stitching image Chinese characters into a word and a mobile terminal comprising the system.

Description of Related Arts

Chinese characters constitute the oldest continuously used system of writing in the world. Studies in China have shown that functional literacy in written Chinese requires a knowledge of between three and four thousand characters. Chinese characters should not be confused with Chinese words, as the majority of modern Chinese words, are written with two or more characters, each character representing one syllable and/or morpheme.

Chinese morphology is strictly bound to a set number of syllables with a fairly rigid construction. Although many of these single-syllable morphemes (zi, 字) can stand alone as individual words, they more often than not form multi-syllabic compounds, known as ci(词), which more closely resembles the traditional Western notion of a word. A Chinese ci ("word") can consist of more than one character-morpheme, usually two, but there can be three or more.

Chinese character image cards have become an important means for beginners to learn Chinese. A related technology has disclosed an approach of learning Chinese by scanning Chinese character image cards using a mobile terminal, specifically: scanning, with a camera of the mobile terminal, an image card bearing one Chinese character, and displaying the Chinese character on a display screen of the mobile terminal upon a successful scanning, thereby achieving the objective of learning the Chinese character.

Although the above scanning and displaying solution enables a beginner to learn Chinese characters to a certain extent, it still has the following drawbacks:

(1) Chinese is a complicated language. Chinese includes single Chinese characters, compounds, idioms, and proverbs, wherein the compounds, idioms and proverbs include at least two Chinese characters. The technical solution above is ineffective when scanning a plurality of Chinese character image cards; consequently, the beginners cannot learn the compounds, idioms, and proverbs well. Further, the meanings of compounds, idioms, and proverbs always differ greatly from the meanings of separate constituent Chinese characters, such that even the beginners know the meanings of the separate single Chinese characters, they will be still at loss over the meaning of the word combination. This greatly dampens their learning efficiency and makes it difficult and strenuous to learn Chinese;

(2) the above solution only displays a Chinese character on the display screen through a mobile terminal, and a beginner can only see the image of the character. However, Chinese characters number in thousands and they are always used in fixed collocations. The related solution can hardly help the beginners to memorize both the characters and the meanings of their collocations, which also significantly lowers the learning efficiency.

SUMMARY OF THE PRESENT INVENTION

The present disclosure is intended to solve, to a certain extent, at least one of the technical problems above or at least provide a useful commercial option. To this end, an object of the present disclosure is to provide a system for stitching image Chinese characters into a word. In the system, a scanning module scans a plurality of images, wherein a physical space of each image is mapped with one logic space on which a colliding unit is formed; when a collision event between the colliding unit of the image and a colliding unit of its neighboring image occurs in the logic space, an associating module associates the Chinese character corresponding to the colliding unit with the Chinese character corresponding to the colliding unit of its neighboring image to generate a word, and when the word was recorded in a pre-stored vocabulary, a displaying module displays the word; in this way, the system enables Chinese beginners to learn words such as compounds, idioms, and proverbs, which improves the efficiency of the Chinese beginners to learn Chinese, promotes their learning enthusiasm, and enhances user experience. Another object of the present disclosure is to provide a mobile terminal that employs the system for stitching image Chinese characters into a word.

A system for stitching image Chinese characters into a word according to the present disclosure comprises: a vocabulary database module configured for storing original vocabulary, wherein the original vocabulary includes a plurality of pre-stored words; a scanning module configured for scanning a plurality of images according to a certain order, wherein each image bears one Chinese character, and a physical space of each image is mapped with a logic space on which a colliding unit is formed; a determining module connected with the scanning module, configured for determining whether a collision event occurs between the colliding unit and a colliding unit of its neighboring image; an associating unit connected with the determining module, configured for associating, when the collision event occurs between the colliding unit and the colliding unit of its neighboring image, the Chinese character corresponding to the colliding unit with the Chinese character corresponding to the colliding unit of its neighboring image to generate a word; a comparing module connected with the associating module, configured for comparing the word with the original vocabulary to confirm whether the word was recorded in the original vocabulary; and a displaying module connected with the comparing module, configured for displaying the word when the word was recorded in the original vocabulary.

In the system for stitching image Chinese characters into a word according to the present disclosure, the scanning module scans a plurality of images, wherein a physical space of each image is mapped with one logic space on which a colliding unit is formed; when a collision event between the colliding unit of the image and a colliding unit of its neighboring image occurs in the logic space, an associating module associates the Chinese character corresponding to the colliding unit with the Chinese character corresponding to the colliding unit of its neighboring image to generate a word, and when the word was recorded in a pre-stored vocabulary, the displaying module displays the word; in this way, the system enables Chinese beginners to learn vocabulary such as compounds, idioms, and proverbs, which improves the efficiency of the Chinese beginners in learning Chinese, promotes their learning enthusiasm, and enhances user experience.

Additionally, the system for stitching the image Chinese characters into a word according to the present disclosure may also have the following additional technical features:

The determining module is further configured for determining that the collision event occurs between the colliding unit of the image and the colliding unit of the its neighboring image when the image contacts its neighboring image or a distance therebetween is within a preset threshold range.

The system further comprises an adding module connected with the comparing module and the vocabulary database module, respectively, wherein the adding module is configured for adding the word to the vocabulary database module when the word was not recorded in the original vocabulary.

The original vocabulary in the vocabulary database module may be customized by a user.

The certain order refers to at least one of: from left to right, from right to left, from up to down, from down to up, from upper left to lower right, from lower right to upper left, from lower left to upper right, and from upper right to lower left.

Each of the plurality of images includes a data file, the data file including an image number ID, an image display name, a picture path for image storage, an image difficulty level, textual display of the image, voice path of the image, video path of the image, stroke order storage path of the image, and stroke picture path of the image, wherein each image number ID is unique.

A size of the logic space of the each image is uniquely mapped with a size of the physical space of the image.

The display module is further configured for demonstrating the word in a pictographic way.

The present disclosure further provides a mobile terminal, the mobile terminal comprising the system for stitching image Chinese characters into a word according to any one of the above.

The mobile terminal according to the present disclosure comprises a system for stitching image Chinese characters into a word; in the system. the scanning module scans a plurality of images, wherein a physical space of each image is mapped with one logic space on which a colliding unit is formed; when a collision event between the colliding unit of the image and a colliding unit of its neighboring image occurs in the logic space, an associating module associates the Chinese character corresponding to the colliding unit with the Chinese character corresponding to the colliding unit of its neighboring image to generate a word, and when the word was recorded in a pre-stored vocabulary, a displaying module displays the word; in this way, the mobile terminal enables a Chinese beginner to learn vocabulary such as compounds, idioms and proverbs, which improves the efficiency of the Chinese beginners in learning Chinese, promotes their learning enthusiasm, and enhances user experience.

The above features and advantages of the present disclosure will be partially illustrated through the depictions infra, or partially become apparent from the depictions infra, or be understood through implementing the present disclosure.

BRIEF DESCRIPTION OF THE DRAWINGS

The above and/or other features and advantages of the present disclosure will become more apparent and easily comprehensible through the description of the embodiments with reference to the accompanying drawings, in which.

DETAILED DESCRIPTION OF THE PREFERRED EMBODIMENT

Figure 1:
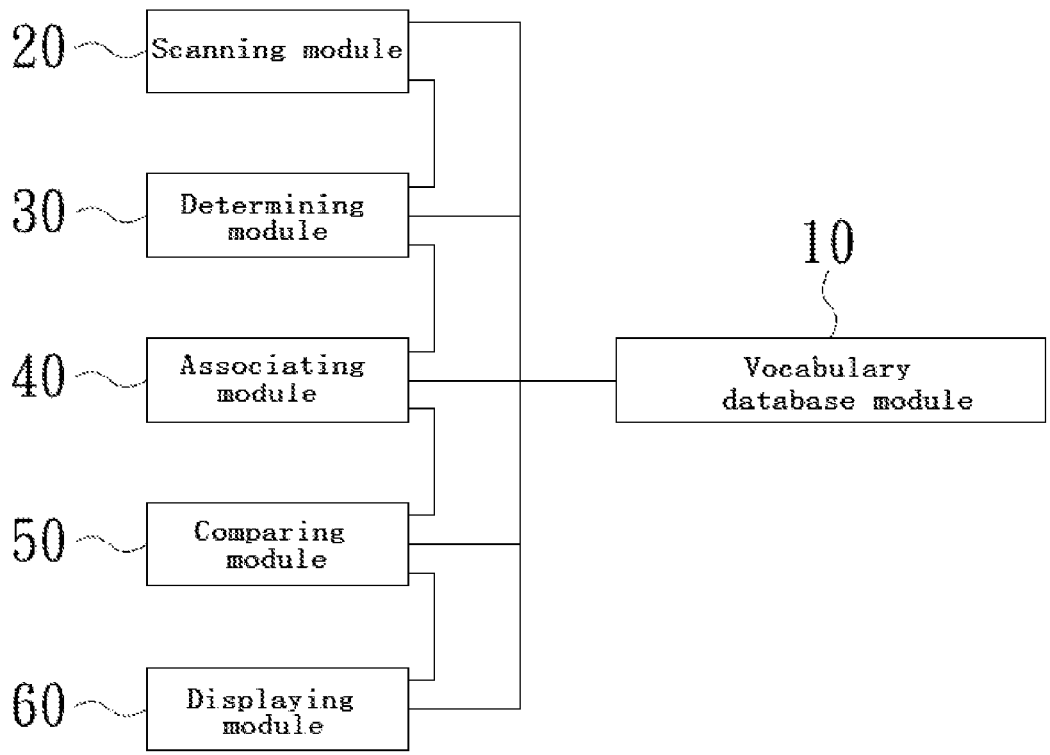
FIG. 1 is a structural block diagram of a system for stitching image Chinese characters into a word according to an embodiment of the present disclosure.

Hereinafter, the embodiments of the present disclosure will be described in detail. Exemplary embodiments are shown in the drawings, and like or same reference numerals represent like or same elements or elements having like or similar functions. The embodiments described with reference to the accompanying drawings are intended to explain the present disclosure, which shall not be construed as limiting the present disclosure.

Figure 2:
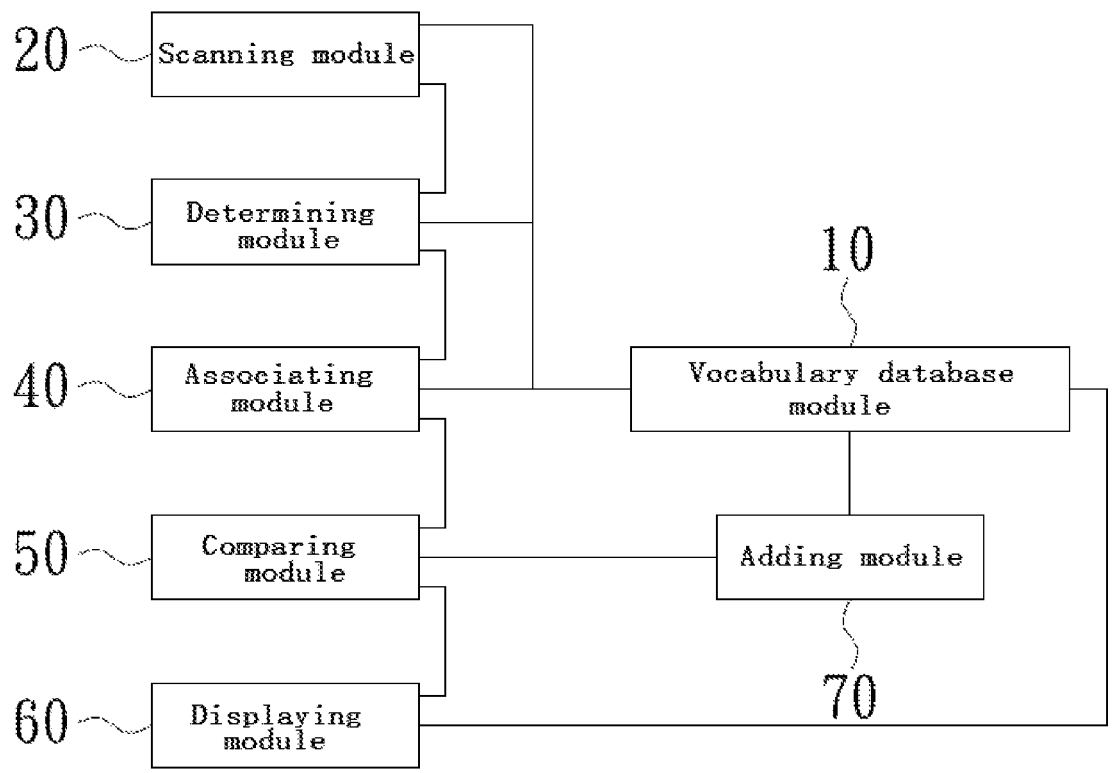
FIG. 2 is a structural block diagram of a system for stitching image Chinese characters into a word according to another embodiment of the present disclosure.
Figure 3:
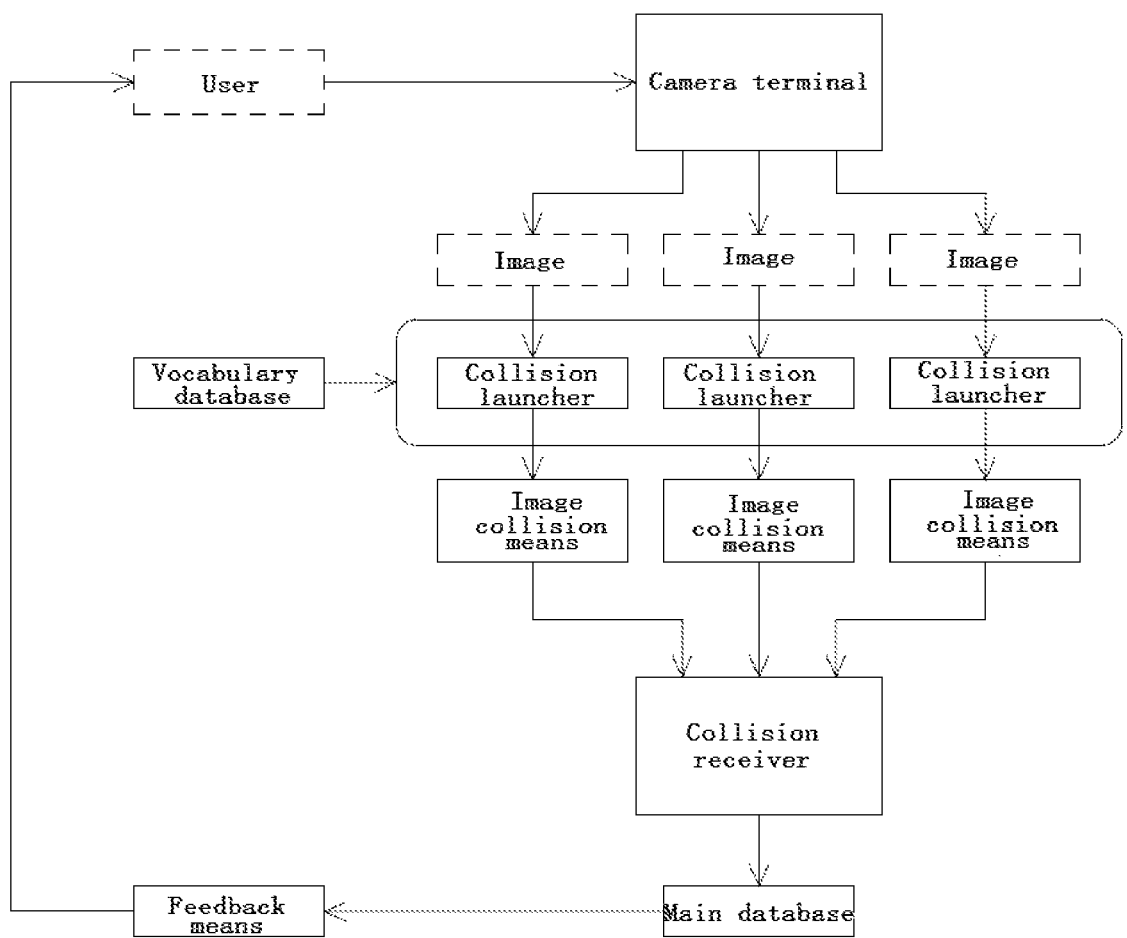
FIG. 3 is a network topological diagram of a system for stitching image Chinese characters into a word according to an embodiment of the present disclosure.

FIG. 1 is a structural block diagram of a system for stitching image Chinese characters into a word according to an embodiment of the present disclosure; FIG. 2 is a structural block diagram of a system for stitching image Chinese characters into a word according to another embodiment of the present disclosure; FIG. 3 is a network topological diagram of a system for stitching image Chinese characters into a word according to an embodiment of the present disclosure. Referring to FIGS. 1~3, the present disclosure provides a system for stitching image Chinese characters into a word, the system for stitching image Chinese characters into a word being applied in a mobile terminal; the system may implement scanning of a plurality of Chinese character images, stitching the plurality of Chinese characters into a word, and then displaying the word; in this way, the system realizes word learning by scanning a plurality of Chinese character images.

Referring to FIG. 1, the present disclosure provides a system for stitching image Chinese characters into a word, comprising a vocabulary database module 10, a scanning module 20, a determining module 30, an associating module 40, a comparing module 50, and a displaying module 60.

The vocabulary database module 10 is configured for storing original vocabulary, wherein the original vocabulary includes a plurality of pre-stored words. That is, the vocabulary database module 10 stores a plurality of pre-stored words, the plurality of pre-stored words including, but not limited to, Chinese characters, compounds, idioms, and proverbs; the original vocabulary should be as exhaustive as possible, at least including common Chinese characters and compounds.

The scanning module 20 is configured for scanning a plurality of images according to a certain order, wherein each image bears one Chinese character, and a physical space of each image is mapped with a logic space on which a colliding unit is formed; Specifically, the scanning module 20 may be a camera module. The camera module scans a plurality of images arranged in a certain order, wherein each image bears one Chinese character. The physical space of the image refers to the space where the image is practically present. The physical space of the image is correspondingly mapped with a logical space, the logical space of the image referring to the space evolved based on the physical space of the image. A colliding unit is formed on the logical space. For example, the camera module scans each image (in a format of bmp, jpeg, png, tga, psd, or raw); if a similarity between the image bearing the Chinese character and a pre-stored image is greater than 80%, it is believed that the image bearing the single Chinese character is successfully recognized; on the contrary, if a similarity between the image bearing the Chinese character and a pre-stored image is less than 80%, it is believed that recognition of the image bearing the single Chinese character fails. The scanning module 20 scans the Chinese characters on a plurality of images according to a certain order. When the plurality of images are arranged in a certain order, the order of forming the word from the plurality of Chinese characters arranged according to the certain order is then determined. Those skilled in the art may easily understand that the image similarity level adopted for image recognition is not limited to 80%, which may be changed and set based on a complexity level of the image per se.

The determining module 30 is connected with the scanning module 20, the determining module 30 being configured for determining whether a collision event occurs between the colliding unit and a colliding unit of its neighboring image. Specifically, in an embodiment of the present disclosure, the scanning module 30 scans three images each bearing one Chinese character, the three images being arranged in an order of from left to right. The determining module 30 is configured for determining whether a collision event occurs between the colliding unit of the image at the left side and the colliding unit of the image in the middle, and meanwhile further determining whether a collision event occurs between the colliding unit of the image in the middle and the colliding unit of the image at the right side.

In a specific implementation, the determining module 30 is further configured for determining that the collision event occurs between the colliding unit of the image and a neighboring colliding unit when the image contacts its neighboring image or a distance therebetween is within a preset threshold range. A trigger condition for the collision event between the colliding unit of one image and its neighboring colliding unit is that: the image contacts its neighboring image or a distance therebetween is within a preset threshold range. When the image contacts the other image, the determining module 30 determines that a collision event occurs between the respective colliding units of the two images; when the image does not contact the other image, but a certain distance exists therebetween, the determining module 30 calculates the distance between the two images; when the distance therebetween does not exceed a preset threshold, determines that a collision event occurs between the respective colliding units of the two images; when the distance therebetween exceeds a preset threshold, determines that a collision event does not occur between the respective colliding units of the two images. Generally, when the two images contact or are relatively close in distance, a user, for example a Chinese beginner, may easily associate the Chinese characters on the two images, which also facilitates learning a word combined by the two Chinese characters; on the contrary, when the two images are relatively far in distance, it is not easy for the user to associate the Chinese characters on the two images. In a specific implementation, a preset threshold is set to 10%~20% of a length of a narrower edge of the image; when the distance between two images exceeds the preset threshold, the determining module 30 determines that no collision event occurs to the respective colliding units of the two images. The basis for the determining module 30 in the embodiment of the present disclosure to determine whether a collision event occurs between the colliding unit of an image and a neighboring colliding unit is whether the logic space of the image and the logic space of its neighboring image contact, i.e., whether the two images directly contact in the physical space or whether the distance therebetween is within a preset threshold range. Those skilled in the art can easily understand that the preset threshold is not limited to 10%~20% of the length of the narrower edge of the image, which may be modified and set dependent on specific conditions of different learners, e.g., for a younger learner, a larger preset threshold scope may be set so as to increase the probability of occurrence of the collision event in the logic space.

The associating unit 40 is connected with the determining module, the associating unit 40 being configured for associating, when the collision event occurs between the colliding unit and a colliding unit of its neighboring image, the Chinese character corresponding to the colliding unit with the Chinese character corresponding to the colliding unit of its neighboring image to generate a word. In other words, when the determining module 30 determines that a collision event occurs between the colliding unit of an image and the colliding unit of the neighboring image, the associating module 40 associates the Chinese characters on the two associated images with occurrence of the collision event to generate a word. It may be understood that in this embodiment, a two-character word is taken as an example; three-character words or words formed by more than three characters are also applicable to the embodiments of the present disclosure.

The comparing module 50 is connected with the associating module 40, the comparing module 50 being configured for comparing the word with the original vocabulary to confirm whether the word was recorded in the original vocabulary. That is, when the associating module 40 associates the Chinese characters on two or more images into a word, the comparing module 50 compares the word with the pre-stored original vocabulary in the vocabulary database module 10 to confirm whether the word exists in the vocabulary database module 10.

The displaying module 60 is connected with the comparing module 50, the displaying module 50 being configured for displaying the word when the word was recorded in the original vocabulary. Specifically, the displaying module may be a display screen of the mobile terminal; when the comparing module 50 confirms, through comparison, that the word exists in the vocabulary database module 10, the displaying module 60 may display the word; when the comparing module 50 confirms, through comparison, that the word does not exist in the vocabulary database module 10, the displaying module 60 might not display the vocabulary, or turns to execute other operations.

In the system for stitching image Chinese characters into a word according to the present disclosure, the scanning module 20 scans a plurality of images, wherein a physical space of each image is mapped with one logic space on which the colliding unit is formed; when a collision event between the colliding unit of the image and a colliding unit of its neighboring image occurs in the logic space, the associating module 40 associates the Chinese character corresponding to the colliding unit with the Chinese character corresponding to the colliding unit of its neighboring image to generate a word, and when the word was recorded in a pre-stored vocabulary, the displaying module 60 displays the word; in this way, the system enables Chinese beginners to learn vocabulary such as compounds, idioms, and proverbs, which improves the efficiency of the Chinese beginners in learning Chinese, promotes their learning enthusiasm, and enhances user experience.

In a specific implementation, referring to FIG. 2, the system further comprises an adding module 70 connected with the comparing module 50 and the vocabulary database module 10, respectively, wherein the adding module 70 is configured for adding the word to the vocabulary database module 10 when the word was not recorded in the original vocabulary 10. That is, when the comparing module 50, through comparison, confirms that the word does not exist in the vocabulary database module 10, the adding module 70 may add the word to the vocabulary database module 10 to thereby expand the vocabulary volume of the vocabulary database module 10. Specifically, because the Chinese language constantly develops, for example, some loanwords will be introduced or some new words may be evolved, providing of the adding module 70 enables these loanwords and newly evolved words into the vocabulary database module 10, thereby constantly expanding the vocabulary volume of the vocabulary database module 10, such that the user may learn more words.

In a specific implementation, the original vocabulary in the vocabulary database module 10 may be customized by a user. Specifically, the user may perform add, delete, replace and other operations to the original vocabulary in the vocabulary database module 10. For example, when the user spots a new word but finds that the new word is absent in the vocabulary database module 10, he/she may add the word to the vocabulary database module 10; when the user has become relatively familiar with some words such that a repetitive learning is unnecessary, he/she may delete these familiar words from the vocabulary database module 10, which saves the storage capacity; while when the user finds that some original words in the vocabulary database module 10 are wrong, he/she may use correct words to replace the original wrong words. By setting the original words in the vocabulary database module 10 to be editable by the user, the system for stitching image Chinese characters into a word according to the present disclosure may update, in real time, the original vocabulary in the vocabulary database module 10, which promotes the accuracy of Chinese learning and enhances user experience.

In a specific implementation, the scanning module 20 scans a plurality of images according to a certain order. The certain order may be customized by the user, e.g., adopting at least one of: from left to right, from right to left, from up to down, from down to up, from upper left to lower right, from lower right to upper left, from lower left to upper right, and from upper right to lower left. In this embodiment, for the convenience of the user, the scanning module 20 may scan the plurality of images in an order from left to right or from top to down. In other embodiments, the scanning order may also be customized by the user.

In a specific implementation, each of the plurality of images includes a data file, the data file including an image number <ID>, an image display name<name>, a picture path for image storage<Image>, an image difficulty level <level>, textual display of the image <word>, voice path of the image <AudioStroke>, video path of the image<Movie>, stroke order storage path of the image <ImageStroke>, and strokes picture path of the image<SimpleStroke>, wherein each image number <ID> is unique. Specifically, because the number of strokes, the order of strokes, and the difficulty level of each Chinese character are unique, and the image number ID of each image word may be set based on the number of strokes, the order of strokes, and the difficulty level; besides, the data type is reshaped data, which cannot be modified by any input device. That is, each image includes a Chinese character, and a data file associated with the Chinese character; the data file includes the image number ID that is unique; by setting the image number ID of each image to be unique, it may be avoided that each image number ID corresponds two different Chinese characters, thereby preventing errors.

In a specific implementation, a size of the logic space of each image is uniquely mapped with a size of the physical space of the image; in an embodiment of the present disclosure, by setting the size of the logic space of each image to be spaced enough far in a default state, the logic space of the image may be kept distant enough from the logic space of its neighboring image, thereby preventing collision by mistake due to a too near distance between the logic space of the image and the logic space of its neighboring image. In an embodiment of the present disclosure, it is preferable that a standard size of the single image on a logic space is a 6*6 square; in this case, the logic space of the single image includes a spatial three-dimensional coordinate (X, Y, Z), where X—the image number ID*8*2 corresponding to the image, Y=−1000, Z=0. Specifically, when the program runs, the image textual data in the vocabulary database module 10 are digitally numbered, starting from 1, incrementing by 1 each time, successively arranged. By generating the spatial three-dimensional coordinate (the image number ID*8*2, −1000, 0) based on the image number ID, a mistaken collision event of any single image on the logic space may be prevented. For example, supposing there are three image cards, which are "大" (adult), "小" (young), and "人" (person), respectively, their image number IDs being 32, 28, and 5, respectively, three-dimensional coordinates (512, −1000, 0), (448, −1000, 0), and (80, −1000, 0) are generated by parsing in the logic spaces, respectively; and when scanning, the X-axis coordinate values of the respective images are modified based on the scanning order to trigger a potential collision event. For example, the word "大人" (adult person) is present in the vocabulary database module 10, while the word "小人" (young person) is absent; when the scanning module 20 scans from the character "大" (adult) to the character "人" (person), the colliding unit of the character "大" (adult) collides with the colliding unit of the character "小" (young), and the associating module 40 associates the character "大" (adult) with the character "小" (young) to generate a word) "大人" (adult person); the comparing module 50 confirms, through comparison, that the word "大人" (adult person) is present in the vocabulary database module 10, and then the displaying module 60 displays a three-dimensional simulated animation of "大人" (adult person) on the display screen of the mobile terminal and plays the audio of "大人" (Da Ren). However, if the scanning order is from left to right, i.e., "人大" (person adult), there would be no effect. If the scanning module 20 scans "小人," "人小," "大小人," and "小人人," there would be no effect likewise.

In a specific implementation, the display module 60 is further configured for demonstrating the word in a pictographic way. That is, after the displaying module 60 displays the word on the display screen of the mobile terminal, it also demonstrates the word in a pictographic way, facilitating the user to memorize the writing manner of the word and the meaning expressed based on the pictographic variation of the word, which enhances user experience.

FIG. 3 is a network topological diagram of a system for stitching image Chinese characters into a word according to an embodiment of the present disclosure. Hereinafter, a collision principle of the colliding units formed on logical spaces of a plurality of images according to the embodiments of the present disclosure will be illustrated with reference to FIG. 3. As shown in FIG. 3, the present disclosure employs a multi-image recognizing and stitching technology comprised of a camera terminal, a vocabulary database, a collision launcher, an image collision means, a collision receiver, and a main database device enables a more accurate recognition and stitching of multiple images scanned; it calculates after the user stitches the images so as to organically combine the images with terminal displaying, thereby enhancing the user's cognition level on the image contents to experience the endless charm of Chinese character images.

The vocabulary database is configured for controlling a data file with a unique image number, the data file including an image number <ID>, an image display name<name>, a picture path for image storage<Image>, an image difficulty level <level>, textual display of the image <word>, voice path of the image <AudioStroke>, video path of the image<Movie>, stroke order storage path of the image <ImageStroke>, and strokes picture path of the image<SimpleStroke>. The vocabulary database sets the image number ID based on the number of strokes, the order of strokes, and the difficulty level; the data type is reshaped data, which cannot be modified by any input device. It may be understood that the vocabulary database records the image name, the picture path, the image difficulty level, the image text, the audio file of the image, the video file of the image, the stroke order of the image, and the strokes of the image. Upon request, the vocabulary database may provide the image number information of the successfully recognized image to the collision launcher.

Specifically, a user controls various formats of the image output, including bmp, jpeg, png, tga, psd, raw, displays the image completely for example on the display screen of the mobile terminal, compares the displayed picture with the original picture stored in the database; if the picture similarity is greater than a predetermined match level, it indicates that the image recognition is successful, and a plurality of successfully recognized results and the image number information are sent to the collision launcher.

The collision launcher is configured for controlling a collision process and a spatial position calculation of an image. Specifically, the collision launcher provides a Collider (this function is available in the existing Unity 3D software), which includes a three-dimensional spatial coordinate, mainly functioning for the user to click and swipe. Firstly, the received image number ID is calculated to obtain the three-dimensional spatial coordinate of the collision launcher. Secondly, recognition results of a plurality of images are received; upon a successful recognition, the Collider is dynamically added onto the image, and the Collider and the image number information are sent to the image collision means.

The image collision means is configured for controlling output of image collision; the image collision means, by receiving the Collider, recalculates the position of the Collider in the screen space (logic space), wherein the position of the Collider changes with movement of the image. The image collision means sends a plurality of Collider positions and the image number information to the collision receiver. For example, when the terminal screen displays two or more images and the Colliders collide with each other, a collision event will be triggered like magnets (the function is available in the Unity3D software); when the word formed after collision is present in the main database and the position order of the characters meets the logic, a video or a three-dimensional model animation will be displayed on the terminal screen based on an augmented reality technology, and the corresponding audio will be played.

The collision receiver is configured for controlling a collision effect such that the collision position meets a normal thinking logic. The collision receiver receives the positions of the Colliders of a plurality of image collision means; after the collision positions of two or more Colliders are subjected to comparative calculation on X-axis, Y-axis, and Z-axis, whether each Collider is on the left or right, at the top or down, in the front or rear position is determined, and then the position information and the image number information are sent to the main database.

The main database is configured for controlling the text, picture, audio, video, and model included in the image number content. The data file includes: content number <ID>, content name <Name>, content level <Level>, content word <Word>, content audio file <AudioSpell>, content model file <Prefab>, and content-hosting unit <Number>. As a corresponding content name is set for the image number ID of the vocabulary database, the main database cannot be modified by any input device. The main database receives the collision position and image number information of the collision receiver, determines whether the image number information is accurate based on the content name, and sends the recorded content level, content text, content audio file, content model file, and content-hosting unit information to a feedback device.

The feedback device is mainly configured for controlling the information of the text, picture, audio, video, and model. The feedback device receives the content information in the main database, generates a text, a picture, an audio, a video, and a model, and displays them on the camera terminal device to feed back to the user.

The present disclosure further provides a mobile terminal, the mobile terminal comprising the system for stitching image Chinese characters into a word according to any structure above; in the system, the scanning module 20 scans a plurality of images, wherein a physical space of each image is mapped with one logic space on which the colliding unit is formed; when a collision event between the colliding unit of the image and a colliding unit of its neighboring image occurs in the logic space, the associating module 40 associates the Chinese character corresponding to the colliding unit with the Chinese character corresponding to the colliding unit of its neighboring image to generate a word, and when the word was recorded in a pre-stored vocabulary, the displaying module displays the word; in this way, the mobile terminal enables Chinese beginners to learn vocabulary such as compounds, idioms, and proverbs, which improves the efficiency of the Chinese beginners in learning Chinese, promotes their learning enthusiasm, and enhances user experience.

Specifically, the mobile terminal is preferably a mobile terminal adopting an AR (Augmented Reality) technology; the mobile terminal adopting the AR technology may "seamlessly" integrate the real world information and the virtual world information, simulate and overlap, with a computer technology, the entity information (visual, auditory, gustatory, haptic, etc.) which can hardly be experienced in the real world within a certain time period, and applies the virtual information to the real world for human sensory organs, thereby achieving a surreal experience; the real environment and the virtual object are overlapped in real time onto a same picture or simultaneously present in space.

Future development of education products must be a complete system integrating science, network, and big data. The augmented reality (AR) technology is applied to industries such as simulation training, medical care, entertainment, aerospace, tourism, etc., and currently has been developed to a certain scale. The combination of AR with education may break the bottleneck of the traditional teaching methodology where the educated party cannot participate and interact; it supports holo-authentic simulation, presentation and interaction of a class; with its own characteristics in combination with technical means, it embodies the students' initiative, increases the practicality and reality of teaching, and enriches the teachers and students' demands on 3D stereoscopic presentation and practicality.

By scanning a plurality of image texts with a camera of the mobile terminal, displaying the word formed by the plurality of image characters through the display screen of the mobile terminal and meanwhile playing the word via audio, and demonstrating the formation history and meaning of the word via a pictographic animation, the mobile terminal adopting the AR technology in the embodiment of the present disclosure organically combines the image characters and the terminal display, which strengthens the user's understanding of the image character contents and experiencing of the endless charm of the Chinese character images.

In the depictions of the specification, terms such as "an embodiment," "some embodiments," "an example," "specific examples," o "some examples" mean that specific features, structures, materials or characteristics described in conjunction with the embodiment or example are included in at least one embodiment of example of the present disclosure. In the specification, schematic expressions of the above terms do not necessarily refer to the same embodiments or examples. Moreover, the specific features, structures, materials or characteristics as described may be combined in any appropriate way in any one or more embodiments or examples.

Although the embodiments of the present disclosure have been illustrated and described above, it may be understood that the embodiments are exemplary, which should be construed as limiting the present disclosure. A person of normal skill in the art may alter, modify, substitute, and transform the embodiments within the scope of the present disclosure without departing from the principle and purpose of the present disclosure.

What is claimed is:

1. A system for stitching image Chinese characters into a word, comprising:
    a vocabulary database module configured for storing original vocabulary, wherein the original vocabulary includes a plurality of pre-stored words;
    a scanning module configured for scanning a plurality of images according to a certain order, wherein each image bears one Chinese character, and a physical space of each image is mapped with a logic space on which a colliding unit is formed;
    a determining module connected with the scanning module, configured for determining whether a collision event occurs between the colliding unit and a colliding unit of its neighboring image; wherein the determining module is further configured for the collision event occurs between the colliding unit of the image and the colliding unit of the its neighboring image when the image contacts its neighboring image or a distance therebetween is within a preset threshold range;
    an associating unit connected with the determining module, configured for associating, when the collision event occurs between the colliding unit and the colliding unit of its neighboring image, the Chinese character corresponding to the colliding unit with the Chinese character corresponding to the colliding unit of its neighboring image to generate a word;
    a comparing module connected with the associating module, configured for comparing the word with the original vocabulary to confirm whether the word was recorded in the original vocabulary; and
    a displaying module connected with the comparing module, configured for displaying the word when the word was recorded in the original vocabulary.

2. The system for stitching image Chinese characters into a word according to claim 1, further comprising:
    an adding module connected with the comparing module and the vocabulary database module, respectively, wherein the adding module is configured for adding the word to the vocabulary database module when the word was not recorded in the original vocabulary.

3. The system for stitching image Chinese characters into a word according to claim 1, wherein the original vocabulary in the vocabulary database module may be customized by a user.

4. The system for stitching image Chinese characters into a word according to claim 1, wherein the certain order refers to at least one of: from left to right, from right to left, from up to down, from down to up, from upper left to lower right, from lower right to upper left, from lower left to upper right, and from upper right to lower left.

5. The system for stitching image Chinese characters into a word according to claim 1, wherein each of the plurality of images includes a data file, the data file including an image number ID, an image display name, a picture path for image storage, an image difficulty level, textual display of the image, voice path of the image, video path of the image, stroke order storage path of the image, and stroke picture path of the image, wherein each image number ID is unique.

6. The system for stitching image Chinese characters into a word according to claim 5, wherein a size of the logic space of the each image is uniquely mapped with a size of the physical space of the image.

7. The system for stitching image Chinese characters into a word according to claim 1, wherein the displaying module is further configured for demonstrating the word in a pictographic way.

8. A mobile terminal, comprising the system for stitching image Chinese characters into a word according to claim 1.

9. A mobile terminal, comprising the system for stitching image Chinese characters into a word according to claim 2.

10. A mobile terminal, comprising the system for stitching image Chinese characters into a word according to claim 3.

11. A mobile terminal, comprising the system for stitching image Chinese characters into a word according to claim 4.

12. A mobile terminal, comprising the system for stitching image Chinese characters into a word according to claim 5.

13. A mobile terminal, comprising the system for stitching image Chinese characters into a word according to claim 6.

14. A mobile terminal, comprising the system for stitching image Chinese characters into a word according to claim 7.

* * * * *